United States Patent Office 3,398,045
Patented Aug. 20, 1968

3,398,045
BONDING RUBBERY POLYOLEFINS
TO ORGANIC MATERIALS
Robert E. Clayton and Byron M. Vanderbilt, Westfield, N.J., assignors to Esso Research and Engineering Company, a corporation of Delaware
No Drawing. Filed Jan. 2, 1963, Ser. No. 248,904
17 Claims. (Cl. 161—208)

The present invention relates to bonding polymers made from alpha olefins to organic materials. One aspect of the invention concerns the adhesion of rubbery ethylene-propylene copolymers to cellulosic and polyamide fibers by means of organo silanes. Another aspect of the invention relates to bonding halogenated ethylene-propylene rubbers to rayon and nylon tire cords.

It is well known in the art that substantially saturated polyolefin rubbers, especially ethylene-propylene rubber (EPR), are difficult to bond to organic materials, particularly cords, by means of conventional adhesive systems, e.g. adhesives based on resorcinol-formaldehyde-latex systems. Because these synthetic rubbers could be used in the manufacture of articles such as tires and hoses if a suitable bonding means can be found, there is considerable incentive to discover ways of improving the adhesion of rubbery saturated polyolefins to materials such as nylon 6 and rayon.

It has now been found that rubbery synthetic polymers made from alpha olefins, e.g. EPR, can be satisfactorily adhered to cellulosic substances, such as cotton and rayon (a generic term for fibers, staple, and continuous filament yarns composed of regenerated cellulose), by utilizing certain organo oxyl silanes, particularly alkoxy silanes, as bonding agents.

It has furthermore been discovered that the aforementioned bonding agents will improve the adhesion of these rubbery polymers to polyamides, especially the polymeric amides which are known by the generic term "nylon." Examples of suitable nylons are nylon 6 made from polycondensation of caprolactam, and nylon 66 obtained by the condensation of hexamethylene diamine with adipic acid.

The organo oxyl silanes that can be used in practicing the present invention have at least one function that will react with saturated rubbery hydrocarbon or halogenated hydrocarbon polymers. These compounds have the following general formula:

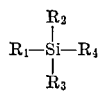

wherein $R_1$ is selected from the group consisting of alkenyl, mercaptoalkyl, epoxyalkyl, aminoalkyl and monocarboxyalkyl radicals, e.g. acryl and methacryl; $R_4$ is selected from the group consisting of hydroxy and alkoxy radicals; $R_2$ and $R_3$ are each independently selected from mercaptoalkyl, alkenyl, epoxyalkyl, aminoalkyl, monocarboxyalkyl, hydroxy, alkyl (e.g. methyl) and alkoxy radicals. Each of the aforementioned radicals that contains carbon will usually have 1 to 4 carbon atoms, and preferably 1 to 3 carbon atoms, except where it is an alkyl radical derived from a hydrocarbon polymer, e.g. butadiene - 1,3 - styrene copolymer. Suitable compounds within the above structure are as follows: aminopropyl-triethoxysilane, aminoethyl-triethoxysilane, aminomethyl-triethoxysilane, aminopropyl - trimethoxysilane, and the corresponding aminoalkyl silanols, acrylalkyl trimethoxysilane, methacrylalkyl trimethoxysilane, vinyl tris(2-methoxyethoxy)silane, allyl silanes, allyl silanols, and the like. Condensation products of the silanols and partially hydrolyzed silane esters, e.g. gamma - aminopropyl-diethoxyhydroxysilane, can also be employed.

While any of the above-mentioned oxyl silanes, i.e. those containing —OR and —OH groups, are useful, the preferred silanes are alkoxy compounds, especially trialkoxy silanes in which the alkoxy groups contain 1 to 3 carbon atoms, e.g. gamma-aminopropyl - triethoxysilane and glycidoxypropyl-trimethoxysilane.

The synthetic polyolefin rubbers that are bonded in accordance with the invention are interpolymers or copolymers of ethylene and higher alpha olefins, i.e. those having 3 to 6 carbon atoms per molecule. The amorphous rubbery interpolymers can contain from 5 to 95 mole percent, preferably 30 to 70 mole percent, of ethylene and 95 to 5 mole percent, preferably 70 to 30 mole percent, of the higher alpha olefin. These saturated hydrocarbon polymers usually have a gum vulcanizate tensile strength in the range of 200 to 500 p.s.i., a softening point below about 50° C., a solubility in xylene at 100° C. of greater than 15 wt. percent, and an apparent modulus of elasticity at $-50°$ C. of less than $1 \times 10^5$ p.s.i., a crystallinity of less than 10% by X-ray analysis and a viscosity average molecular weight of from 25,000 to 500,000. They can be prepared by known processes, such as the low pressure polymerization method described in the literature. (See Belgian Patent 533,362; Chemical and Engineering News, Apr. 8, 1957, pp. 12–16; and Petroleum Refiner, December 1956, pp. 191–196.)

The present invention has particular application to ethylene-propylene rubber because it is one of the most difficult copolymers to bond to fiber-containing substances. Another preferred interpolymer is halogenated ethylene-propylene copolymer. It is known that EPR can be chlorinated or brominated with conventional halogenating agents, such as elemental chlorine or bromine, by contacting the rubber with the halogenating agent at temperatures of 20° to 130° C. while the polymer is dissolved in a suitable solvent, such as a $C_5$ to $C_{10}$ hydrocarbon or chlorinated hydrocarbon, e.g. carbon tetrachloride or chlorobenzene. The halogenation reaction is allowed to continue until the rubber contains from about 1 to 10 wt. percent halogen. The preferred chlorinated and brominated EPR contains about 2 to 6% combined halogen.

In practicing the present invention, an organic silane of the type described above is dissolved in a suitable solvent which can be inorganic, e.g. water, or organic, e.g. aromatic hydrocarbon or saturated aliphatic hydrocarbon, to make a relatively dilute solution of the silane, e.g. 0.1 to 10 wt. percent. To a large extent, the solvent should be selected on the basis of its solubility for the organo silane. If the silane is sufficiently soluble in water, it is usually best to use this as the solvent. On the other hand, certain silanes, such as gamma-mercapto-propyl-trimethoxysilane, are not readily soluble in water; and, therefore, it is necessary to use an organic liquid, such as toluene, benzene, normal heptane, or chlorobenzene. The preferred organic solvents are compounds having 1 to 10 carbon atoms and free of any reactive groups that would interfer with adhesion of the rubber to the material. Examples of preferred organic solvents are paraffinic and aromatic hydrocarbon and chlorinated hydrocarbon liquids.

The concentration of the silane solution is not important and can be varied in accordance with the selected treating conditions. For most purposes, it will be found that solutions of 0.5 to 2 wt. percent will be satisfactory. The concentration of the solution should be chosen so that the weight of the treated material, e.g. rayon or nylon fibers, is increased about 0.1 to 2 wt. percent after the material has been dried. In the case of tire cords, the weight of the woven cord is generally increased about 0.1 to 1.0 wt. percent when it is treated with a silane solution containing about 0.5 to 2 wt. percent of the bonding agent.

Conventional methods known to those skilled in the art can be used to apply the silane to the textile. For example, woven fabrics or individual cords can be passed through a bath consisting of a dilute organo silane solution which is maintained at a temperature ranging from approximately room temperature to about 50° C. While higher and lower temperatures can be utilized, there is generally no significant advantage to using such temperatures.

Instead of employing a bath, the silane solution can be sprayed on the material. This procedure is usually not as desirable as the dipping method.

The period in which the fiber-containing material is in contact with the treating liquid often is in the range of 0.1 second to 2 or 3 minutes. In the case of silanes that react slowly, the material should be left in contact with the bonding agent for several hours or even overnight.

Following treatment with the bonding agent, the wet material is dried by any suitable means to produce a coated material which is substantially free of the solvent utilized in the treating solution. While the drying process can be effected at room temperature by allowing the material to stand for long periods of time, it is generally better to dry the fibrous material in an oven which is at about 50° to 175° C. By utilizing elevated temperatures in the drying process, it is possible to evaporate the solvent in a relatively short time, i.e. about 1 minute to 60 minutes, depending upon the temperature and the characteristics of the solvent.

The dried textile is then bonded to the rubbery polyolefin by embedding it in the rubber, which contains one or more curing agents, fillers, accelerators, pigments, etc., and curing the composition, that is, the fabric embedded in the rubber, at elevated temperatures, usually about 130° to 175° C., for from about 5 minutes to 5 hours. In the case of EPR, it is preferred to cure the compounded rubber in contact with the silane-treated organic material at temperatures of about 150° to 165° C. for about 15 minutes to 1 hour.

Prior to bonding the silane-treated textile to the solid rubbery polymer, it is sometimes advantageous to treat the textile with either a hydrocarbon solution of the rubbery olefin or an aqueous dispersion of the rubber. For example, the treated material can be dipped in a rubber cement consisting of 1 to 20 wt. percent EPR dissolved in a hydrocarbon liquid, such as normal hexane, at approximately room temperature for about 0.1 second to 2 or 3 minutes, and then dried in the manner described above. Alternatively, the treated fabric can be dipped in a latex containing 10 to 50 wt. percent EPR for a similar period of time. Again, the treated fabric should be dried prior to adhering it to the solid rubbery polymer.

Suitable latices of the rubbery interpolymers can be prepared by dispersing a cement, e.g., an EPR dissolved in a $C_5$ to $C_{10}$ hydrocarbon solvent, in 50 to 100 wt. percent water containing about 2 to 10 parts by weight per 100 parts by weight of polymer (php.) of an emulsifier and thereafter stripping the mixture of the hydrocarbon solvent. The emulsifier may be either anionic or nonionic and may be used in conjunction with a stabilizer such as a monovalent salt of an orthophosphate. A particularly suitable anionic emulsifier is the sodium salt of sulfated polyoxyethylated octylphenol containing 3 to 4 ethylene oxide units per molecule. Representative of the type of nonionic emulsifier that can be utilized in the preparation of the latex is polyoxyethylated octylphenol containing 8 to 10 ethylene oxide units.

If a stabilizer is used, it is preferred to employ about 0.5 to 1.5 php. of sodium dihydrogen phosphate. Similar amounts of other stabilizers may also be used.

The solid rubbery interpolymer is usually compounded with a suitable curative or crosslinking agent before it is bonded to the cellulosic or polyamide material. In the case of the nonhalogenated copolymers, such as EPR, about 0.5 to 10 php., preferably 2 to 6 php., of an organic peroxide compound is admixed with the rubber so that a cure will be effected when the compounded rubber is heated in contact with the organic textile. Representative of the types of peroxide curatives that can be utilized are dialkyl, aryl, and aralkyl peroxides, e.g. 2,5-dimethyl-2,5-di(t-butyl peroxy)hexyne-3; 2,5-dimethyl-2,5-di(t-butyl peroxy)hexane; dicumyl peroxide and ditertiary butyl peroxide; alkyl perester peroxides, e.g. ditertiary butyl diperphthalate and tertiary butyl perbenzoate; benzoyl peroxide and mixtures thereof. Any other organic peroxides or other substances that are conventionally employed as curing agents for EPR can also be used.

The curing agents which can be used in the halogenated interpolymers are metal salts, metal oxides, metal powders, amines and polyamines. In general, the metal components of the metal salts, metal oxides, and metal powders are chosen from Groups II–A, II–B of the Periodic Table, and tin, copper and iron. Particularly useful are the metal oxides, sulfides, nitrates, phosphates, sulfates, and organic acid salts of Groups II–A and II–B metals, particularly zinc, cadmium, magnesium, iron and lead.

In the case of the halogenated copolymers, the amount of curing agent admixed with the polymer can range from 1 to 40 php.; however, for most uses, about 2 to 10 php. of the crosslinking agent is suitable.

Optionally, about 0.25 to 25 parts, per 100 parts by weight of polyolefin (php.), preferably 1 to 10 parts, of a polyfunctional compound can be incorporated into the rubbery polyolefins. The polyfunctional compound is either monomeric or polymeric, but contains two or more ethylenically unsaturated carbon-to-carbon linkages, these linkages not being conjugated, and they are groups acting independently of each other. Typical types of compounds which may be employed are the following: polyvinyl compounds, polyisopropenyl compounds, acrylic acid esters of polyhydric alcohols, unsaturated polyesters, such as the maleic anhydride esters of polyhydric alcohols, polyolefins derived from the conventional 1,2 polymerization of conjugated $C_4$ to $C_6$ diolefins, such as normally liquid polybutadiene and the normally liquid copolymeric oils derived from the 1,2 polymerization of conjugated $C_4$ to $C_6$ diolefins with monovinyl substituted mononuclear aromatic compounds, for example, the copolymerization of butadiene with styrene or vinyl toluene; the allyl esters of polybasic acids, such as triallyl cyanurate. The polyvinyl compounds within the purview of this invention are those which can be illustrated by the following structural formula:

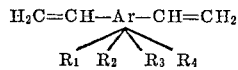

wherein $R_1$, $R_2$, $R_3$ and $R_4$ are each independently selected from the group consisting of hydrogen, halogen, alkyl, and vinyl; and Ar is an aromatic nucleus selected from the group consisting of benzene, naphthalene, biphenyl, anthracene and phenanthrene. Specific examples are divinyl benzene, divinyl toluene, divinyl xylene, divinyl naphthalene and trivinyl benzene.

The normally liquid polymeric and copolymeric oils referred to above can be prepared in accordance with the process outlined in U.S. Patent 2,762,851. Other patents and literature citations could be cited, but this patent is simply exemplary of one method of producing these conventional, normally liquid polymers and copolymers.

The simplest member of an acrylic acid ester of a polyhydric alcohol, which is another type of polyfunctional compound, has the following formula:

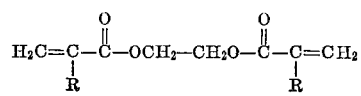

wherein R is selected from the group consisting of hydrogen, halogen, methyl and ethyl. Suitable acids include methacrylic, acrylic, alpha-chloroacrylic, and alpha-bromoacrylic acid. Polyhydric alcohols within the purview of this invention include ethylene glycol, diethylene glycol, propylene glycol-1,2, propylene glycol-1,3, the butanediols, glycerol, 1,1,1-trimethylol propane, and pentaerythritol. The preferred compounds are the dimethacrylate ester of ethylene glycol, the trimethacrylate ester of trimethylol propane, and the tetramethacrylate ester of pentaerythritol.

Besides the polyfunctional compounds and curing agents heretofore described, it is advantageous to incorporate one or more of the following compounding ingredients into the synthetic rubber: 0.1 to 5 parts of sulfur, 0.1 to 4 parts of organic sulfur accelerator, 30 to 200 parts of carbon black, e.g. fine furnace black, or a like amount of finely divided silica; 1 to 50 parts of zinc oxide; 0.5 to 5 parts of stearic acid; 0.5 to 5 parts of aging inhibitors, e.g. polymerized trimethyl dihydroquinoline (Agerite Resin D); and 10 to 50 parts of plasticizer, e.g. a hydrocarbon plasticizing oil of about 80 wt. percent of paraffinic and 20 wt. percent of aromatic content, one example of such mixture known in the trade as Necton 60.

As mentioned above, the compound interpolymers can be cured and bonded to the organic fibers by any of the well known techniques. For example, a suitable method is to sandwich the organic fibers between slabs of compounded rubber in a press mold and raise the temperature of the rubber in the mold to about 150° to 160° C. for about 15 to 70 minutes at pressures of 50 to 1500 p.s.i.g.

The textile-rubber compositions that can be prepared in accordance with the present invention have excellent tensile strength and therefore can be used in a number of articles such as belts, pipes, hoses and tires, electrical insulation and mechanical goods.

The following examples are submitted to further illustrate the invention.

Example 1

An ethylene-propylene rubber containing 55 mole percent ethylene and 45 mole percent propylene and having a viscosity average molecular weight of 240,000 was compounded as follows at 75° to 80° C. on a rubber mill in the conventional way:

Ingredients: Parts by weight
Ethylene-propylene amorphous polymer _____ 100
SRF Black [1] _____ 50
Stearic acid _____ 1
Dicumyl peroxide on HAF Black [2] _____ 5
Sulfur _____ 0.25
Ethylene dimethacrylate _____ 5

[1] Semireinforcing furnace black.
[2] 40 wt. percent dicumyl peroxide supported on 60 wt. percent carbon black. HAF=High Abrasion Furnace black.

Single cords of rayon (regenerated cellulose) and nylon 6 (the polymeric amide made by polycondensation of caprolactam) were soaked for 15 minutes at room temperature in a 0.5% aqueous solution of morpholine, rinsed three times with distilled water and dried in air in order to remove any dirt or sizing that may have been on the cords. Thereafter, the dry cords were immersed in the hereinafter-described silane solutions for one minute and allowed to dry in the air overnight. The treated cords and the compounded rubber were assembled into the H-adhesion mold at room temperature and then the mold was placed in a press which was heated to about 153° C. under 600 p.s.i.g. pressure for 65 minutes. The cured specimens were stored for 24 hours at room temperature and thereafter heated in an oven at 121° C. for 40 minutes. Following the oven treatment, the specimens were tested in the well known single cord adhesion H test at 121° C. The general procedure used for testing the adhesion of a single cord embedded in a rubber sample is described in India Rubber World 114, 213 (1946). The cavity for the rubber matrix measured 0.380″ wide by 0.180″ deep. The spacing between each cavity was 0.250″. The H-shaped specimen was mounted in yoke-type holders on an Instron machine and the jaws were separated at a constant rate of 10″ per minute. The adhesion value is expressed as pounds of force required to pull the cord from the rubber block.

| Silane solution: | H-adhesion (pounds) for rayon cord |
|---|---|
| 1 wt. percent gamma-aminopropyl-triethoxy-silane in water | 15.3 |
| 1 wt. percent glycidoxypropyl-trimethoxysilane in water | 15.0 |
| 1 wt. percent methacrylpropyl-trimethoxysilane in water (adjusted with acetic acid to pH of 5) | 16.3 |
| 1.5 wt. percent trimethoxysilyl derivative of butadiene-styrene polymer oil [1] in toluene | 17.8 |
| 1.5 wt. percent gamma-mercapto-propyl-trimethoxysilane in toluene | 13.8 |
| No treatment | 8.3 |

[1] A liquid polymeric oil derived from approximately 80 wt. percent butadiene and 20 wt. percent styrene by means of a sodium polymerization technique in which 1,2 polymerization predominates. It has a molecular weight of approximately 2,000 and an iodine number of approximately 300.

Even better adhesion is obtained when cotton cords are used instead of rayon because of the former's rough surface and larger area.

When a cord consisting of nylon 6 was treated with 1 wt. percent gamma-aminopropyl-triethoxysilane in water and embedded in the above-mentioned ethylene-propylene composition, it gave an H-adhesion value of 11.1 pounds, while an untreated sample of the same cord had an H-adhesion value of only 6.5 pounds.

When a cord made of a polyester derived from methyl terephthalate and ethylene glycol was substituted for either the rayon or nylon cord in the above-mentioned test, essentially no increase in adhesion was obtained over the control regardless of which type of organo silane was used to treat the polyester. Thus, the silane bonding agents of the present invention are not useful for adhering substantially saturated interpolymers of alpha monoolefins to every kind of organic fiber; but, rather, they are useful only when employed to treat cellulosic and polyamide fibers and fabrics.

Example 2

Chlorinated ethylene-propylene rubber (having a viscosity average molecular weight of 230,000) containing 53 mole percent ethylene and 43 mole percent propylene, as well as 4 wt. percent combined chlorine, is compounded as follows and H-adhesion specimens are prepared with the rayon cords described in Example 1, except that the time in the curing press is 35 minutes.

Ingredients: Parts by weight
Chlorinated ethylene - propylene amorphous polymer _____ 100
SRF Black _____ 50
Zinc oxide _____ 5
Stearic acid _____ 1
Sulfur _____ 1.25
2-mercaptobenzothiazole _____ 0.5
Tetramethyl thiuram disulfide _____ 1.0

The adhesion of the single rayon cords to the cured compounded rubber is substantially greater than that which is obtained when untreated rayon cord is embedded in the same rubber composition.

Example 3

Solid ethylene-butene-1 rubber containing 55 mole percent ethylene and 45 mole percent butene-1 is compounded in accordance with Example 1, and single rayon cords prepared in Example 1 are embedded in the rubber which is then cured in a press in the manner described in the aforementioned example. In each instance, the rubber's adhesion is better than the control.

In addition to being substantially ineffective when polyester fibers and fabrics are used in place of rayon and nylon, the silanes of the present invention do not improve adhesion when other low unsaturation rubbers are substituted for the alpha olefin interpolymers. For instance, when chlorinated isobutylene-isoprene butyl rubber having a viscosity average molecular weight of 375,000 and a chlorine content of 1.2% is compounded as follows and evaluated in the H-adhesion test with rayon or nylon cords treated with the silane solutions described in Example 1, substantially no increase in adhesion is obtained.

Ingredients: Parts by weight
- Chlorinated isobutylene-isoprene copolymer --- 100
- Fine thermal black ---------------------- 50
- Magnesium oxide ------------------------ 2
- Stearic acid ---------------------------- 1
- Zinc oxide ------------------------------ 3
- Necton 60 [1] --------------------------- 10
- Benzothiazyl disulfide ------------------ 2
- Tetramethyl thiuram disulfide ---------- 1

[1] Liquid plasticizing hydrocarbon containing about 78% saturates and 22% aromatics and having a flash point of about 445° F.

Having set forth the general nature and the specific embodiments of the present invention, the scope of the invention is now particularly pointed out in the appended claims.

What is claimed is:

1. A method of bonding a saturated rubbery copolymer of ethylene and a higher alpha olefin to a fibrous substance selected from the group consisting of cellulose, cellulose derivatives and nylon which comprises applying an organo oxyl silane to the surface of said fibrous substance, said organo oxyl silane having at least one function that is reactive with said copolymer, contacting said surface with said rubbery copolymer which is admixed with a curing agent capable of crosslinking the rubbery copolymer, and heating the rubbery copolymer in contact with said surface thereby crosslinking said rubbery copolymer and adhering it to said surface.

2. Method of claim 1 in which the fibrous substance is rayon.

3. Method of claim 1 in which the copolymer comprises combined ethylene and propylene.

4. Method of claim 1 in which the copolymer is halogenated.

5. Method of claim 1 in which the organo oxyl silane is a trialkoxyl silane.

6. A method of bonding a saturated rubbery copolymer of ethylene and propylene to rayon fibers which comprises applying a dilute solution of an organo oxyl silane having the formula:

wherein $R_1$ is selected from the group consisting of alkenyl, aminoalkyl, epoxyalkyl, mercaptoalkyl and carboxyalkyl radicals, $R_4$ is selected from the group consisting of hydroxy and alkoxy radicals, and $R_2$ and $R_3$ are each independently selected from the group consisting of mercaptoalkyl, alkenyl, epoxyalkyl, aminoalkyl, carboxyalkyl, hydroxy, alkoxy and alkyl radicals to the surface of said fibers, drying the fibers, embedding the dried fibers in said rubbery copolymer which is admixed with a small amount of a peroxide curing agent, and heating the copolymer to at least 130° C. for at least 5 minutes thereby curing it and bonding it to said fibers.

7. Method of claim 6 in which the solution of organo oxyl silane is an aqueous solution of methacrylalkyl trimethoxysilane.

8. An article comprising a cured saturated rubbery copolymer of ethylene and a higher alpha olefin bonded to a fibrous substance selected from the group consisting of cellulose, cellulosic derivatives and nylon by means of an organo oxyl silane on the surface of said fibers, said organo oxyl silane having at least one function that is reactive with said copolymer.

9. The article of claim 8 in which the fibrous substance is rayon.

10. The article of claim 8 in which the organo oxyl silane is an aminoalkyl alkoxysilane in which the aminoalkyl and alkoxy groups each contain 1 to 3 carbon atoms.

11. The article of claim 8 in which the rubbery copolymer comprises combined ethylene and propylene.

12. The article of claim 11 in which the organo oxyl silane is methacrylalkyl-trimethoxysilane.

13. The article of claim 8 in which the copolymer is halogenated.

14. Method of claim 1 in which 0.25–25 parts, per 100 parts by weight of the rubbery copolymer, of a monomeric or polymeric polyfunctional compound containing at least two nonconjugated ethylenically unsaturated carbon-to-carbon linkages is admixed with said rubbery copolymer prior to contact of the rubbery copolymer with said fibrous substance.

15. Method of claim 14 wherein the polyfunctional compound is selected from the group consisting of polyvinyl compounds, polyisopropenyl compounds, acrylic acid esters of polyhydric alcohols, unsaturated polyesters, polyolefins derived from the conventional 1,2 polymerization of conjugated $C_4$–$C_6$ diolefins and copolymeric oils derived from the 1,2 polymerization of conjugated $C_4$–$C_6$ diolefins with monovinyl substituted mononuclear aromatic compounds.

16. A method of bonding a saturated rubbery copolymer of ethylene and a higher alpha olefin to a fibrous substance selected from the group consisting of cellulose, cellulose derivatives and nylon which comprises:
(a) applying an organo oxyl silane to the surface of said fibrous substance, said organo oxyl silane having at least one function that is reactive with said copolymer;
(b) thereafter treating the surface of said fibrous substance with a hydrocarbon solution or an aqueous dispersion of the rubbery copolymer;
(c) contacting the surface of the fibrous substance from step (b) with said rubbery copolymer which is admixed with a curing agent capable of cross-linking the rubbery copolymer; and
(d) heating the rubbery copolymer in contact with said surface, thereby crosslinking said rubbery copolymer and adhering it to said surface.

17. Method of claim 16 in which the copolymer present in the hydrocarbon solution or aqueous dispersion in step (b) comprises combined ethylene and propylene.

References Cited

UNITED STATES PATENTS

| | | | |
|---|---|---|---|
| 3,000,866 | 9/1961 | Tarney | 260—80.5 |
| 3,013,915 | 12/1961 | Morgan | 156—307 X |
| 3,058,859 | 10/1962 | Amberg | 161—243 |
| 3,228,793 | 1/1966 | Stemmer et al. | 117—161 |
| 3,241,592 | 3/1966 | Sheary | 156—123 X |

EARL M. BERGERT, *Primary Examiner.*

CLIFTON B. COSBY, *Assistant Examiner.*